3,610,004
PARKING LOCK FOR TRANSMISSIONS
Philip C. Neese, Anderson, Ind., assignor to General
Motors Corporation, Detroit, Mich.
Filed Sept. 30, 1969, Ser. No. 862,380
Int. Cl. B60r 25/06; E05b 51/02; E05c 1/12
U.S. Cl. 70—248                                     7 Claims

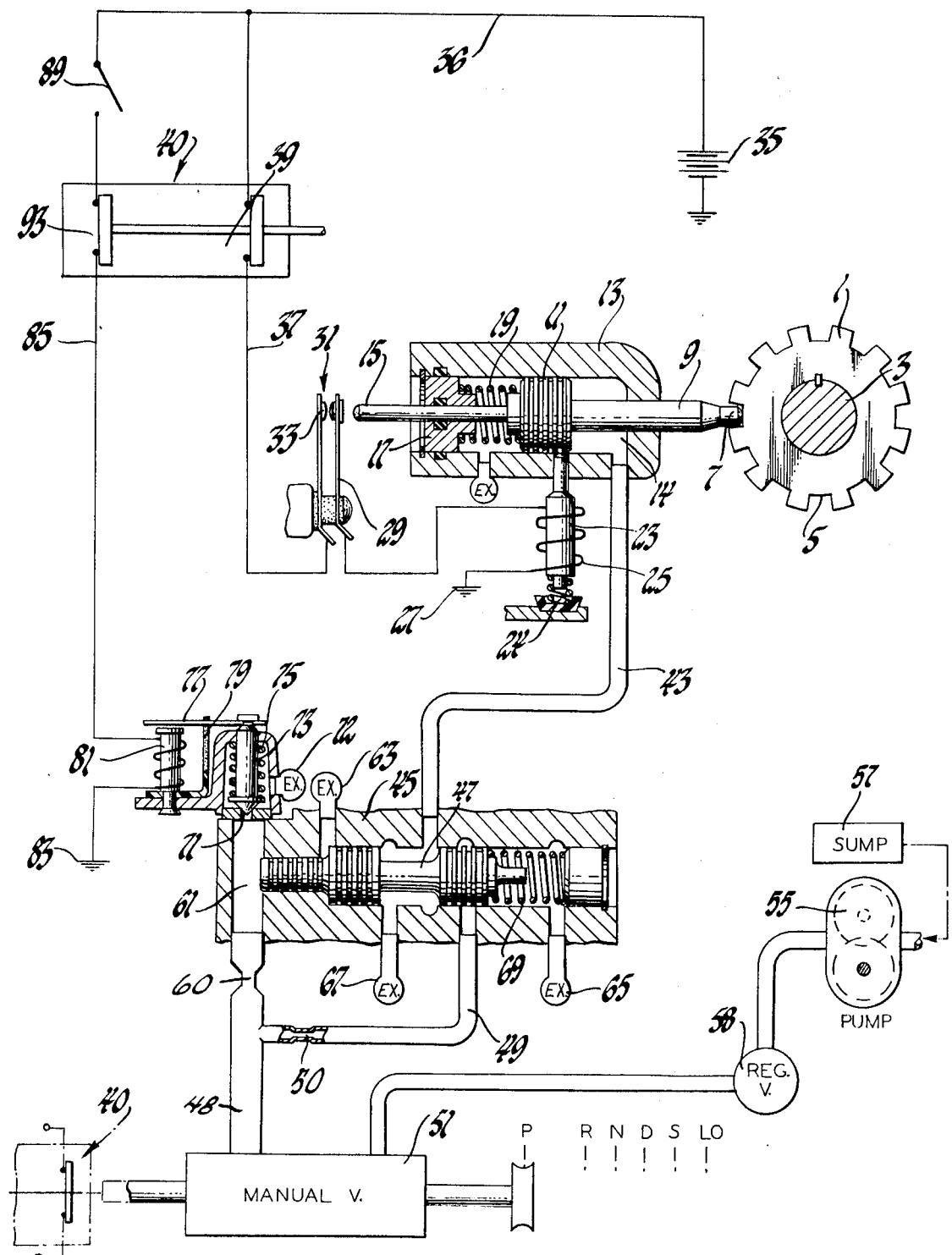

ABSTRACT OF THE DISCLOSURE

The parking lock has a piston with a rod that engages and locks a locking wheel fixed to a transmission output shaft. For unlocking the output shaft, a hydraulic control valve is operative to direct pressure fluid to the piston to move the rod from engagement with the locking wheel to an unlock position. When this position is reached a blocker pin automatically moves to keep the piston in the unlock position until there is a transmission lock signal. Electric controls are energized to effect the shift of the hydraulic valve to dump the unlock pressure fluid and also to withdraw the blocker pin from its blocking position. A spring device then effects reengagement of the piston rod and the locking wheel.

---

This invention relates to locking mechanisms for transmissions and more particularly to a transmission parking lock and its controls which feature the hydraulically-actuated release of a locking mechanism from locking engagement with a transmission output shaft.

Parking locks presently being used in vehicles generally have a special mechanical linkage connecting the selector control such as a lever to a parking pawl. The parking pawl is urged into engagement with a transmission locking gear by a spring mechanism when the lever or control is in the park position; when the lever is moved from the park position, the linkage will be actuated to pull the pawl from locking engagement with the locking gear so that the transmission can transmit power to the differential and drive wheels.

This invention provides a space-saving parking lock which eliminates the parking pawl linkage and which makes more effective use of the hydraulic controls of an automatic transmission. The parking lock of this invention is oriented with transmission controls and incorporates a piston-operated locking pin which is biased into engagement with a locking wheel by a spring device. The locking pin is moved from engagement with the locking wheel on the transmission output shaft in response to conditioning of controls for unlock including the movement of a selector valve to a predetermined position such as the drive position. For disengagement, pressure fluid acts on the piston to overcome the opposing force of the spring to move the piston and locking pin from engagement with the locking wheel. In this invention a hydraulic locking valve which controls the release of the lock operates, when the vehicle ignition switch is closed and the locking switch is opened, to route pressure fluid to the piston so that it will disengage. A spring biased blocker pin is employed to keep the piston in the disengaged position until locking signal is received.

An object of this invention is to provide a new and improved parking lock and parking lock controls for an automatic transmission which comprise a locking member having a piston section which cooperates with a housing to establish a control chamber. The locking member is biased into locking engagement by a spring mechanism and is moved from locking engagement by a control pressure selectively routed to the control chamber. Hydraulic controls are provided to supply and exhaust pressure from the control chamber and electrical controls are employed to control the movement of a locking member block pin and to control the position of a flow control locking valve.

Another object of this invention is to provide new and improved controls for effecting the engagement and disengagement of a transmission parking lock including hydraulic controls for exerting a large release force on a transmission locking member in response to conditioning of the controls for the unlock of the transmission.

Another object of this invention is to provide a new and improved parking lock for a transmission which entirely eliminates the need for mechanical linkages connecting a selector lever with a transmission locking pawl and which incorporates a hydraulic motor mechanism for effecting the efficient unlocking of the transmission in response to conditioning of controls for transmission unlock.

Another object of this invention is to provide a new and improved lock for a transmission output shaft including a hydraulically actuated piston mechanism for moving the lock from disengagement with a transmission output shaft and incorporating a blocker pin which automatically moves to positively prevent movement of the piston into a locking position until a demand is made for transmission lock.

These and other objects, advantages and features of the invention will become more apparent from the following detailed description and drawing in which:

The figure is a diagrammatic view illustrating a preferred embodiment of the invention.

As illustrated in the figure there is an annular park lock gear 1 rigidly secured to an output shaft 3 of a transmission. This gear has a plurality of locking notches or keeper means 5 provided in the outer periphery which are sized to receive the end 7 of the piston rod 9. The piston has an enlarged cylindrical section 11 which is slidably mounted in a bore within housing 13 and forms a pressure chamber 14 in that housing. The piston has a longitudinally extending rear pin 15 that extends through the end closure member 17 of housing 13 as shown. There is a coil spring 19 seated on the closure member that contacts the adjacent end of the piston section to exert a force urging the piston toward the park lock gear so that the end 7 will engage in one of the notches thereby locking the transmission output shaft.

A blocker pin 23 is mounted in the housing transverse to the piston and has an end portion mounted for axial movement into and out of the chamber to hold and release the piston. The other end of this pin is a steel core which extends through a solenoid 25 and is biased by coil spring 24 into engagement with the outer circumference of the piston section when the piston rod is in the locking position. If the piston section is moved to the left, the spring 24 in the absence of current through the solenoid will force the pin into blocking position in front of the piston section. In this blocking position the end 7 of the piston will not be able to move into engagement with the notches in the locking wheel. The coil forming the solenoid is grounded at 27 and is also connected by a conductor to contact 29 of a solenoid control switch 31. This switch has a second contact 33 operatively connected to the hot line 36 of a battery 35 by a conductor 37 in which there is disposed a switch 39 of a locking switch unit 40.

The chamber 14 is adapted to receive a pressure fluid from the hydraulic apply line 43 leading from the lock control valve 45. This valve has a valve element 47 shiftably mounted therein to control the supply of fluid to and exhaust of fluid from chamber 14. The lock control valve 45 is supplied with pressure fluid through line 48 leading from the manual valve and branch line 49, having fluid flow control restriction 50, connecting line 48 with the lock control valve.

The manual valve has a shiftable valve element operatively connected to a transmission control lever so that it can be moved to various positions illustrated as P, R, N, D, S and LO to condition the transmission for particular conditions such as park, reverse, neutral, automatic drive, second range drive and low range drive respectively. This valve element is operatively connected to the drive switch unit 40 as illustrated in the figure so that the switch unit is closed when the manual valve is moved to the park position. When it is moved from the park position to the other positions the switch will be opened. The manual valve and the transmission controls may be basically the same as those shown in U.S. Pat. 3,400,613 to I. R. Johnson et al.

There is a conventional pressure regulator valve 58 interposed in the line between the pump and the manual valve to regulate the pressure fed to the transmission controls.

Line 48 leading from the manual valve has a flow control orifice 60 and is connected to a chamber 61 formed at one end of the lock control valve and into which one end of the valve element 47 extends. This valve has exhaust passages 63 and 65 which are used to exhaust fluid from either end of the valve and has exhaust 67 which is used to exhaust the chamber 14 of the locking mechanism under predetermined valve operating conditions.

Valve 45 has a valve spring 69 which exerts a force on the valve element to tend to move it into the illustrated chamber exhaust position. This force opposes the force exerted by the fluid in chamber 61 formed at the other end of the valve element which receives the pressure fluid from the pressure line 49. This latter chamber has an outlet orifice 71 which when opened communicates with exhaust 72; the outlet orifice is normally closed by a plunger 73. The plunger is closed by the force of a coil spring 75 trapped in the housing and seated on a collar on the plunger. The upper end of the plunger is fastened to one end of an armature 77 which can be rocked on an insulated support 79. The iron core of a solenoid 81 is also mounted on this insulator as shown in the figure. The coil forming this solenoid is grounded at 83 and is connected to the battery 35 by a line 85. Disposed in this line 85 are an ignition switch 89 along with a second locking switch 93 of the locking switch unit 40. As shown, locking switches 39 and 93 are mechanically tied together by a link so that both switches can be closed or open at the same time by operation of the valve element of the manual valve.

The parking lock as shown in the figure is in the engaged or locked position with the piston pin in engagement with the lock wheel where it remains due to the force from the coil spring 19. In this position, the transmission output shaft cannot turn and the vehicle is stationary. At this time the contacts of the switch 31 are open so there is no current flow through the coil 25 and the blocker pin biasing spring 24 is held under compression by the blocker pin that is in engagement with the piston section of the piston. Also, since the engine is not running, no pressure exists in either the apply line or pressure line. The valve element 47 of the lock control valve is biased by its spring so that the pressure line 49 is blocked by one of the lands of the valve element and so that the apply line 43 and chamber 14 are opened to the sump 57 through the exhaust 67.

The plunger 73 of the solenoid valve is held down by its spring so that the orifice 71 is closed; the solenoid 81 has no signal since the ignition switch is opened and the lock switch unit 40 is closed indicating that the system is in a locked request position.

To prepare to move the vehicle, the ignition switch is closed and the engine started; pressure from the pump 55 appears in the pressure line and current is passed through the switch 89 into the coil of the solenoid valve since the lock switch unit is closed. This causes the armature 77 to be moved and plunger 73 compresses the spring to open the orifice 71. With orifice 71 open there can be no appreciable pressure established in the chamber 61. The valve element 47 of the lock control valve remains in the position shown and no fluid pressure is generated in the apply line. The piston pin thus remains in the lock position.

The parking lock switch unit 40 is then opened by any suitable means such as by shifting the manual valve to the unlock position to condition the system so that it effects the unlocking of the transmission. The signal current through the solenoid coil 81 is interrupted and the spring 75 moves the plunger into blocking engagement with the orifice 71. Pressure builds up in the chamber 61 moving the valve element to the right to compress the valve spring 69 to block exhaust 67 and permit the fluid from the source to pass from pressure line 49 into the apply line 43 and up into the pressure chamber 14 behind the piston section. Fluid pressure then builds up in this chamber and moves the piston to the left to compress the spring 19 and close the contacts of the switch 31. This action removes the end 7 of the piston from the locking wheel. The piston pin moves until it has compressed the spring and bottoms against the end of the bore on the closure member. In this piston position the blocker pin 23 is pushed into the chamber and into blocking position in front of the piston section by spring 24. The piston pin will now remain disengaged from the lock wheel until the blocker pin is removed from the chamber 14 even when there is no pressure in the chamber. The selector valve can subsequently be moved to condition the transmission for a particular operation such as reverse or automatic drive.

The engagement of the piston pin end with the lock wheel is accomplished by closing the locking switch 40 so that current will flow through the coils 25 and 81. The ignition switch is on and there is pressure in the pressure line 49 and, when the circuit through the solenoid coil 81 is established the armature moves the plunger 73 to compress spring 75 and open orifice 71. The pressure in chamber 61 drops as it is opened to exhaust 72. When this occurs, the valve element 47 moves to the position shown in the drawing by the force of spring 69 and the chamber 14 is exhausted through exhaust 67.

The switch 39 of the lock switch unit 40 when closed, causes a current signal to pass through the switch 31 held closed by the piston pin and on through the coil 25. The current flow through the coil causes the blocker pin 23 to move out of the chamber 14 and compress the spring. As soon as the blocker pin is removed from chamber 14, the spring 19 forces the piston pin end 7 into engagement with the lock wheel to lock the transmission output shaft. This piston movement allows the contacts of the switch 31 to open.

Current flow through the coil 25 is stopped when the contacts of switch 31 are allowed to open. The blocker pin 23 is held out of the chamber 14 by the piston section 11 which has moved to the illustrated position. When the ignition switch is opened to stop the engine, pump 55 stops and there is a decay of the pressure in the pressure line 49 so that the pressure in the chamber 61 drops. The opening of the ignition switch interrupts the signal current flow through the coil of the solenoid valve so that the spring can move the plunger to close the orifice 71. However, since the engine is not running, there is low level pressure in this chamber and the spring will keep the valve element 47 in the position where the apply line and the chamber 14 are opened to the exhaust.

With this invention, mechanical linkages connecting the shift lever and the parking pawl such as that shown in U.S. Pat. to Mrlik et al. 2,875,856, are not needed and in effect, replaced by an electrical conductor. This provides important engineering benefits since the conductor is more flexible and easier to work with and saves space. Also, no adjustment is needed as in the case of a connecting linkage and service life is improved. To provide for larger release forces, the piston could be made with two or more piston sections working in separate fluid-tight chambers communicating with apply line to provide a larger release area. It will be appreciated that housing 13 is fixed to the transmission case or other stationary support. Also, any suitable locking construction could be employed in place of the locking wheel. In the event that this invention is to be applied to a linear moving system instead of a rotational system, a suitable cog or serrated member could be used to replace the locking wheel.

This invention is not limited to the details of the construction shown and described for purposes of illustrating the invention for other modifications will occur to those skilled in the art.

I claim:

1. A parking lock for an automatic transmission for vehicle propulsion comprising a locking member rigidly secured to a rotatable transmission output, said locking member having a plurality of keeper means disposed in a predetermined pattern around said transmission output, locking means selectively movable into and out of engagement with any one of said keeper means to correspondingly hold and release said locking member, motor means for moving said locking means from a first position out of engagement with said locking member to a second position into engagement with said locking member and any one of said keeper means to thereby positively lock said transmission output without substantial movement of said transmission output after said lock means engages said locking member, a housing for said locking means, said locking means having a piston section fixed thereto and operatively disposed within said housing to form a pressure chamber therein, a source of fluid pressure operatively connected to said pressure chamber, fluid flow control means operatively disposed between said source and said pressure chamber having a valve element movable to one position for directing a pressure fluid from said source to said chamber to effect the movement of said locking means for said second position to said first position to thereby unlock said transmission output and movable to a fluid exhaust position for directly exhausting pressure fluid from said chamber to permit said motor means to move said lock means from said first position to said second position and thereby lock said transmission output from rotation.

2. The parking lock defined in claim 1 and further comprising blocker means mounted for movement in said housing between a blocking position contacting said shiftable lock means to prevent said lock means from being moved from said first position into said second position and a retracted position spaced from said movable lock means to allow said lock means to be moved from said first into said second position, and control means for moving said blocker means from said blocking position to said retracted position to permit said motor means to automatically move said lock means from said first into said second position.

3. The parking lock defined in claim 1 and further comprising a control chamber formed in one end of said control valve operatively connected to said source, a fluid exhaust outlet for said control chamber, closure means for blocking said outlet so that pressure from said source can build up in said control chamber to shift said valve means to said first position to connect said source with said first mentioned pressure chamber, and operator means for moving said closure means from said opening to exhaust said control chamber to permit said valve element to be shifted to said second position and exhaust fluid from said pressure chamber.

4. The parking lock defined in claim 1 wherein said fluid flow control means comprises a fluid flow control valve operatively connected to said pressure chamber having a valve element shiftable to a first position to direct pressure fluid to said chamber and shiftable to a second position to exhaust pressure fluid from said chamber, spring means operatively connected to said valve element for shifting it to a control chamber disposed at one end of said valve element operatively connected to said source, a solenoid valve for opening and closing said control chamber, a source of electrical energy, circuit means including switch means for connecting said source of electric energy and said solenoid valve effecting energization of said solenoid valve so that it opens said control chamber to decay pressure therein to permit said fluid-flow control valve to shift and exhaust said pressure chamber and thereby permit said locking means to engage said fixed locking member.

5. The parking lock defined in claim 4 and further comprising a blocker pin mounted in said housing for engaging and holding said shiftable lock means in said first position, spring means for urging said blocker pin into said housing, solenoid means for retracting said blocker pin into a release position, circuit means connecting said solenoid means to said source of electric energy, said last mentioned circuit means having first and second switches, said first switch being closed by said shiftable lock in said first position, a transmission control lever, said transmission being operatively connected to said second switch to open said switch and deenergize said solenoid means when moved from a predetermined position, to permit said blocker pin to be biased into blocking engagement with said shiftable lock means to keep it in said first position.

6. A locking mechanism for an automatic transmission in a vehicle having a rotatable transmission output shaft with an annular locking member rigidly secured thereto, said locking member having a plurality of keeper means spaced completely around said locking member, a selectively shiftable locking pin movable from a retracted position into a locking position in engagement with said locking means and any one of said keeper means to thereby positively lock said output shaft from rotation, motor means for moving said pin between said retracted position to said second postion, shift control means operatively connected to said motor means selectively movable to a plurality of positions for conditioning the transmission for a plurality of automatic transmission operations including low, automatic change speed forward drive, neutral, reverse and park, a source of fluid pressure operatively connected to said shift control means, a control valve operatively disposed between said shift control means and said motor means, said control valve having a valve element automatically shiftable to a first position in response to movement of said shift control means to any position except park to direct pressure to said motor means so that said motor means moves said locking pin to the retracted and unlocking position and said valve element being automatically shiftable to a second position in response to movement of said shift control means to park to exhaust pressure fluid from said motor means to allow said motor means to move said locking pin to said locking position.

7. A parking lock for an automatic transmission having a rotatable output member comprising a locking member rigidly secured to said output member, said locking member having a plurality of openings, a support rigidly secured relative to said output member, a shiftable locking member mounted for movement in said support between a first position in which said locking members are disengaged and unlocked and a second position in which said locking members are engaged so that said shiftable locking member can enter any of said openings and thereby prevent any substantial rotation of said output member after said locking members are engaged, fluid operated motor means operatively connected to said shiftable locking member for moving said shiftable locking member from said second position to said first position, second motor means operatively connected to said shiftable locking member for moving said shiftable locking member from said first position to said second position, a source of fluid pressure, fluid conducting means including fluid flow control valve means operatively connecting said source and said fluid operated motor means for directing fluid to and from said fluid operated motor means, said valve means having a control hydraulically connected to said source and having an exhaust, means for opening and closing said exhaust comprising solenoid means for opening said exhaust, a source of electrical energy, circuit means operatively connecting said source of electrical energy and said solenoid means, said circuit means including switch means for controlling said circuit means and said solenoid, blocker means for preventing said movable locking member from moving from said first position to said second position, solenoid means for moving said blocker means to a retracted position when energized, circuit means including first and second switch means for connecting said solenoid means to said source of electrical energy, said first switch means being closed by shiftable locking member when in said first position so that said solenoid means is energized to retract said blocker means in response to closure of said second switch means thereby enabling said second motor means to effect engagement of said locking members when said valve means has directed fluid away from said fluid operated motor means.

References Cited
UNITED STATES PATENTS

| | | | |
|---|---|---|---|
| 1,997,107 | 4/1935 | Cullinan | 70—275 X |
| 2,121,366 | 6/1938 | Robinson | 303—89 X |
| 2,211,406 | 8/1940 | Cannon | 60—53 |
| 2,974,752 | 3/1961 | Howard | 188—69 |
| 3,159,051 | 12/1964 | Herndon | 74—645 |
| 3,365,036 | 1/1968 | Forrester | 188—265 X |
| 3,401,545 | 9/1968 | Fraser | 70—255 |

ROBERT L. WOLFE, Primary Examiner

U.S. Cl. X.R.

70—136, 275, Dig. 48; 292—144

PO-1050
(5/69)

UNITED STATES PATENT OFFICE
CERTIFICATE OF CORRECTION

Patent No. 3,610,004      Dated October 5, 1971

Inventor(s) Philip C. Neese

It is certified that error appears in the above-identified patent and that said Letters Patent are hereby corrected as shown below:

Column 5, line 35, (Claim 1) change "for" to -- from --.

Signed and sealed this 30th day of May 1972.

(SEAL)
Attest:

EDWARD M. FLETCHER, JR.
Attesting Officer

ROBERT GOTTSCHALK
Commissioner of Patents